Nov. 5, 1946.  C. J. HAAG  2,410,579

REVERSIBLE WHEEL

Filed Nov. 11, 1944

INVENTOR
CARL J. HAAG
BY
ATTORNEY

Patented Nov. 5, 1946

2,410,579

UNITED STATES PATENT OFFICE 2,410,579

REVERSIBLE WHEEL

Carl J. Haag, Detroit, Mich., assignor to The Budd Company, Philadelphia, Pa., a corporation of Pennsylvania Application November 11, 1944, Serial No. 562,936

4 Claims. (Cl. 301—9)

This invention relates to wheels and particularly to means for demountably securing wheel bodies to a wheel hub.

It is a particular object of the invention to demountably secure a disc wheel body to a hub flange having a substantially planar face against which the wheel is bolted and to provide separate reinforcing means for the wheel body in the region of securement to the hub which supports the wheel body some distance radially outwardly of the hub, and to so form the interengaging parts of the wheel body and its reinforcing means that the securing means hold them firmly clamped in engagement with said substantially planar face of the hub with the metal thereof under some tension.

A further object is to make the wheel body so reinforced reversible on the hub to fit it for use in agricultural vehicles or the like, in which reversible wheel mountings are desirable to vary the tread. The arrangement is such as to permit the use of the same securing means for both positions of the reversible wheel body.

It is a further object to provide a wheel body of this class in which a pair of such wheel bodies may, by the use of a longer securing means be used to form with the hub a dual wheel. Other and further objects and advantages and the manner in which they are attained will become apparent from the following detailed description, when read in connection with the drawing forming a part of this specification.

Figure 1:
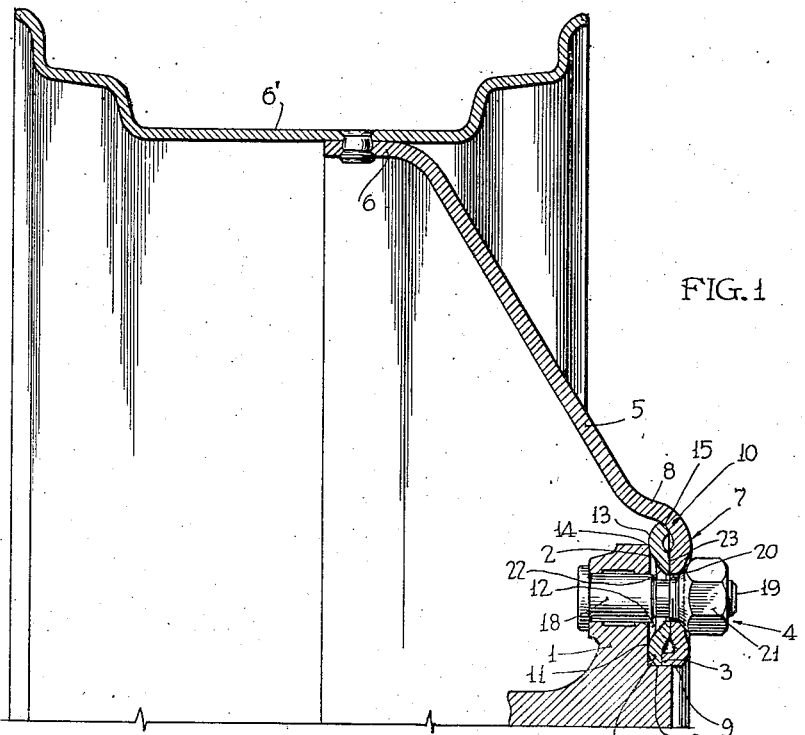
Fig. 1 is a part sectional view in an axial plane of a wheel mounting according to the invention.

In the drawing, the hub flange on which the wheel body or bodies are adapted to be mounted is indicated by the numeral 1, the flange being shown provided with a usual substantially planar face 2 extending radially outwardly from an annular shoulder 3 on the hub. The hub flange is provided with the usual annular series of securing means, as 4, arranged in circumferentially spaced relation to each other.

The wheel body to be mounted on the hub flange 1 may comprise, as shown, a dished metal disc 5 having an axially extending rim seating flange 6 at its outer periphery to which is secured a rim 6' as by rivets or the like. Around its central opening the disc 5 is formed with a generally radially extending mounting portion 7 merging with the outer conical portion of the disc through an offset portion 8 disposed some distance radially outwardly of the outer periphery of the hub flange 1 when the wheel body is mounted thereon.

The mounting portion 7 is formed at its inner margin with an axially extending flange 9 forming a radially inner seating zone. A radially outer seating zone is provided at 10. A reinforcing ring, designated generally by 11, is disposed against the planar face 2 of the hub flange and clamped by the securing means between it and the wheel body. This reinforcing ring is spaced in its body portion from the seating face on the hub flange, as indicated at 12 and is formed with a bead 13 at its outer periphery one side of which bears against the hub flange at 14 and the outer periphery 15 of the ring bears against the wheel body in the seating zone 10. At its inner periphery the ring 11 is formed with an axially inwardly offset portion 16 which seats against the hub flange, and is engaged on its axially outer face by the edge of the flange 9 on the wheel body.

Thus, it will be seen that the ring 11 seats against the hub flange only at radially outer and inner zones and it similarly seats against the wheel body in radially outer and inner zones, the outer zone 10, however, being disposed some distance outwardly of the hub flange periphery to provide a wider support for the wheel body.

In the region between their interengaging radially outer and inner zones, the wheel body and ring are spaced from each other except to the extent that they may be drawn together in the region of the securing means, under the clamping action of said means.

In the region between the radially outer and inner seating zones, the wheel body mounting portion 7 and the ring 11 are provided each with an annular series of openings, the openings being axially aligned with each other and each aligned pair of openings loosely receiving the securing means therethrough.

Each securing means may comprise a headed stud 18 non-rotatably secured in the hub flange 1. This stud has an axially outer reduced diameter threaded portion 19 loosely passing through the associated aligned openings. Around each opening, the wheel body is formed on its outer face with a re-entrant seat, such as the conical seat 20, and a securing nut 21 provided with a mating seat is adapted to engage said conical seat, when screwed onto the stud to clamp the wheel body in place.

The ring is provided with a similar conical seat 22, on its side facing the hub flange, as shown in Fig. 1.

With this arrangement, if the securing means between the outer and inner seating zones is tightened, the metal of the disc and ring is forced to yield by the tightening of the nuts, until the portions of the ring and wheel body surrounding the bolt opening are also seated against each other, as shown at 23. This yielding of the parts places them in tension and holds the nuts against loosening, acting like a spring washer. Also, by reason of the interengagement of the wheel body and reinforcing rings in the spaced zones one of which is arranged some distance outwardly of the hub, the wheel is given a very secure support from the hub flange, and a lighter gauge of wheel body in this inner securing region is made possible.

Figure 2:
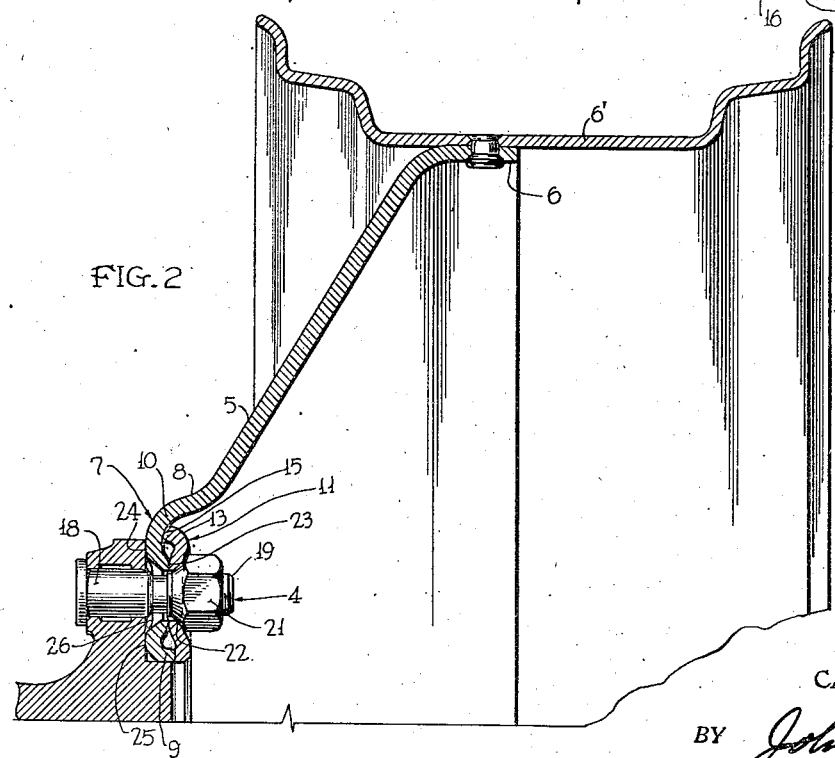
Fig. 2 is a similar view showing the wheel mounted in its reversed position.

In the reverse arrangement shown in Fig. 2, the wheel body seats against the hub flange in the two radially spaced zones 24 and 25 and the engagement between the ring and wheel body is similar to that shown in Fig. 1. The wheel body between the zones 24 and 25 is spaced from the hub flange, as indicated at 26 and the nut of the securing means seats in the re-entrant seat 22 of the ring, when the parts are clamped together. It will be seen that the securing action is similar to that shown in Fig. 1 and the same securing means are utilized.

Since the ring 11 occupies the same position with respect to the wheel body in both the positions shown, it may be secured along its inner margin, as by welding, to the wheel body, so that it may be handled as a unit with the wheel body, when making the reversal.

By using a longer stud on the hub flange, the reinforced wheel body of the invention may be assembled as a dual wheel with the same hub flange. In such case, a wheel disposed as shown in Fig. 2 would be mounted on the securing studs on the axially outer side of a wheel arranged as shown in Fig. 1.

While a specific embodiment of the invention has herein been shown and described, it will be understood that changes and modification may be made by those skilled in the art, without departing from the spirit and scope of the appended claims.

What is claimed is:

1. A reversible wheel comprising a hub flange having a substantially planar outboard face, a wheel body having an attaching portion adapted to seat against said face and a reinforcing ring corresponding in diameter generally to said attaching portion and adapted to seat through one face against the wheel body and through the other face against the outboard face of the hub flange, said attaching portion and ring being spaced in their bodies but arranged to engage each other in radially outer and inner zones, both said attaching portion and said ring having radially spaced raised portions on their non-contiguous faces for engagement alternately with the planar face of the hub flange, axially aligned circumferentially spaced openings being formed in said hub flange, said wheel body attaching portion and said ring in a zone radially intermediate said radially outer and inner zones and said radially spaced raised portions, and securing means extending through said respective aligned openings and clamping the parts together.

2. A reversible wheel comprising a hub flange having a substantially planar outboard face, a wheel body having an attaching portion reinforced on one face thereof by a reinforcing ring whose inner diameter corresponds substantially to the inner diameter of the wheel body attaching portion and whose outer diameter is somewhat greater than the outer diameter of the hub flange, said ring being adapted to seat through one face against the wheel body and through the other face against the outboard face of the hub flange, said attaching portion and ring being spaced in their bodies but arranged to engage each other in radially outer and inner zones, both said attaching portion and said ring having radially spaced raised portions on their non-contiguous faces for engagement alternately with the planar face of the hub flange, axially aligned circumferentially spaced openings being formed in said hub flange, said wheel body attaching portion and said ring in a zone radially intermediate said outer and inner zones and said radially spaced raised portions, and securing means extending through said respective aligned openings and clamping the parts together.

3. A reversible wheel comprising a hub flange having a substantially planar outboard face, a wheel body having an attaching portion reinforced on one face thereof by a reinforcing ring corresponding in diameter generally to said attaching portion, said wheel body attaching portion and ring having their main bodies spaced apart and arranged to engage each other in their contiguous faces in radially outer and inner zones, and having their remote faces formed to engage the hub flange face only in radially outer and inner zones, axially aligned circumferentially spaced openings being formed in said hub flange, said wheel body attaching portion and said ring in a zone radially intermediate said radially outer and inner zones, and securing means extending through said respective aligned openings and clamping the parts together.

4. A reversible wheel comprising a hub flange having a substantially planar outboard face, a wheel body having an attaching portion adapted to seat against said face, and a reinforcing ring corresponding in diameter generally to said attaching portion and adapted to seat through one face against the wheel body and through the other face against the outboard face of the hub flange, said attaching portion and ring being spaced in their bodies but arranged to engage each other in radially outer and inner zones, axially aligned circumferentially spaced openings being formed in said hub flange, said wheel body attaching portion and said ring in a zone radially intermediate said radially outer and inner zones, the faces of the wheel body attaching portion and ring remote from each other each being formed with re-entrant seats around said openings, and securing means extending through the respective aligned openings and clamping the parts together, said securing means having corresponding raised portions fitting the axially outermost of said re-entrant seats around said openings.

CARL J. HAAG.